MAGNETIC FILMS HAVING A PREDETERMINED COERCIVITY

Filed Dec. 4, 1967 2 Sheets-Sheet 1

Inventors:
Donald S. Rodbell;
James M. Lommel,
by John J. Kissane
Their Attorney.

MAGNETIC FILMS HAVING A PREDETERMINED COERCIVITY

Filed Dec. 4, 1967 2 Sheets-Sheet 2

Inventors :
Donald S. Rodbell;
James M. Lommel,
by [signature]
Their Attorney.

United States Patent Office 3,700,500
Patented Oct. 24, 1972

3,700,500

MAGNETIC FILMS HAVING A PREDETERMINED COERCIVITY

Donald Stanley Rodbell, Burnt Hills, and James M. Lommel, Schenectady, N.Y., assignors to General Electric Company Filed Dec. 4, 1967, Ser. No. 687,822
Int. Cl. H01f *10/06*
U.S. Cl. 117—239 2 Claims

ABSTRACT OF THE DISCLOSURE

Magnetic films having a predetermined coercivity are formed by disposing a vacuum deposited, polycrystalline thin magnetic film of iron, cobalt or nickel in an oxygen bearing atmosphere and subsequently annealing the magnetic film at a temperature between 50° C. and 600° C. for a sufficient period, e.g. between 10 to 300 minutes, to increase the coercivity of the magnetic film to a desired value within a fixed range. In a specific instance, a monotonic increase from 38.4 oersteds to 530 oersteds was observed in the coercive force of 300 A. thick iron film upon a glass substrate when annealed for 130 minutes at a pressure of $5\times10^{-5}$ torr. Annealing of the magnetic films generally was found to produce only a fractional decrease in the magnetization of the films.

Figure 1:
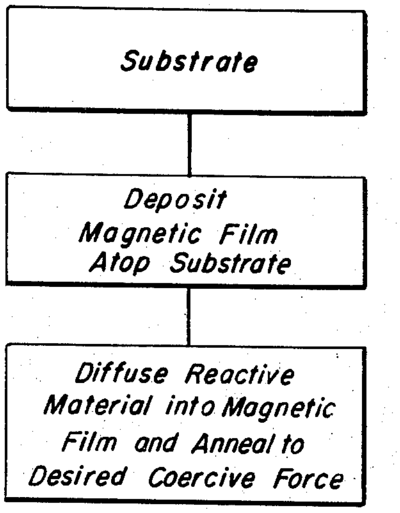

This invention relates to magnetic films having a predetermined coercivity and to a method of forming such films. In particular, the invention is directed to the heating of a magnetic film and a juxtaposed reactive material to magnetically isolate the magnetic film grains and raise the coercivity of the magnetic material to a predetermined level within a fixed range.

Thin magnetic films having both high coercivity and high magnetization generally are desirable for most magnetic recording purposes to produce a high output signal with good resolution and materials such as iron, nickel and cobalt alloys, iron oxide and chrome dioxide generally have been employed prior to this time to produce magnetic films having superior recording characteristics. The formation of these films utilizing conventional powder techniques however requires a uniform dispersion of the component elements of the film to obtain the desired magnetic characteristcis within tolerable limits and films having a predetermined coercivity in specialized recording ranges, e.g. from approximately 20 oersteds to 500 oersteds, generally are not easily obtainable. Furthermore recording films formed by prior art methods tend to become non-uniform in very thin layers thereby adversely affecting their usefulness for high density recording.

It is therefore an object of this invention to provide a method of forming magnetic recording films capable of having a wide range of permissive coercive force.

It is also an object of this invention to provide a simplified method of forming uniform, thin recording films having a predetermined coercive force.

It is a further object of this invention to provide a high efficiency method of forming high coercive force magnetic films.

It is another object of this invention to provide a magnetic recording film having a coercive force which can be readily altered subsequent to formation of the film.

It is a still further object of this invention to provide a magnetic recording film having a coercive force set within a minimum tolerance to a predetermined level.

These and other objects of this invention generally are achieved by disposing a thin, e.g. less than 300 A., magnetic film selected from the group consisting of iron, cobalt, nickel and their alloys in juxtaposition with a material having a component reactive with the magnetic film to form a compound having different magnetic properties. This compound having different magnetic properties could be a compound having no net magnetization, for example FeO, or the compound could have some net magnetization but perferably less than the magnetization of the magnetic film, for example a ferrimagnetic compound such as $Fe_3O_4$. The juxtaposed magnetic film and the material then are heated for a sufficient interval to diffuse a portion of the material into the grain boundaries of the magnetic film thereby forming a surface upon the grains having magnetic properties different from the magnetic properties of the grains and raising the coercivity of the magnetic film to a predetermined value. Thus a magnetic medium formed by the method of this invention is characterized by a magnetic film selected from the group consisting of iron, cobalt, nickel and their alloys positioned upon a substrate with a compound of the magnetic film having different magnetic properties being situated along at least a portion of the grain boundaries of the magnetic film to reduce the area of exchange contact between magnetic film grains. The magnetic film should be less than 3000 A. thick to permit a coercive force rise in accordance with the invention and preferably has a grain size less than 500 A. so as to be of single domain character when isolated. The most convenient source of reactive material utilized in increasing the coercive force of the magnetic film is atmospheric oxygen and the thin magnetic film is annealed under conditions, e.g. baking temperature, pressure and duration, to substantially oxidize the grain boundaries of the magnetic film without effecting a complete oxidation of film. Thus while some interaction between the magnetic film and the reactive material is required, e.g. such as the formation of oxide compounds at the grain surfaces of the magnetic film, the reactive material must be substantially absent beyond the walls of the magnetic film grain boundaries to preserve the magnetic recording characteristics of the film.

Figure 2:
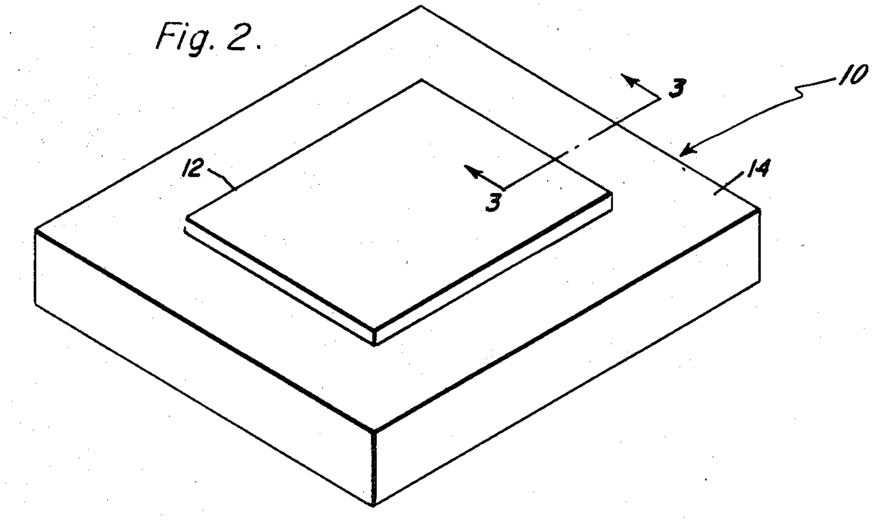
Figure 3:
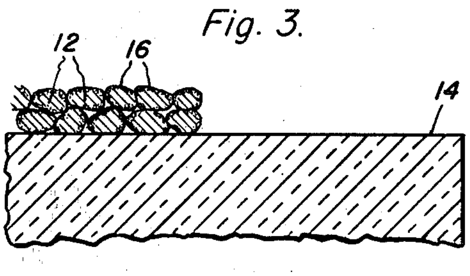

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a flow chart depicting the method of this invention in block diagram form, FIG. 2 is an isometric view of a high coercivity magnetic medium formed in accordance with this invention, FIG. 3 is an enlarged cross-sectional view taken along the lines 3—3 of the magnetic medium depicted in FIG. 2.

Figure 4:
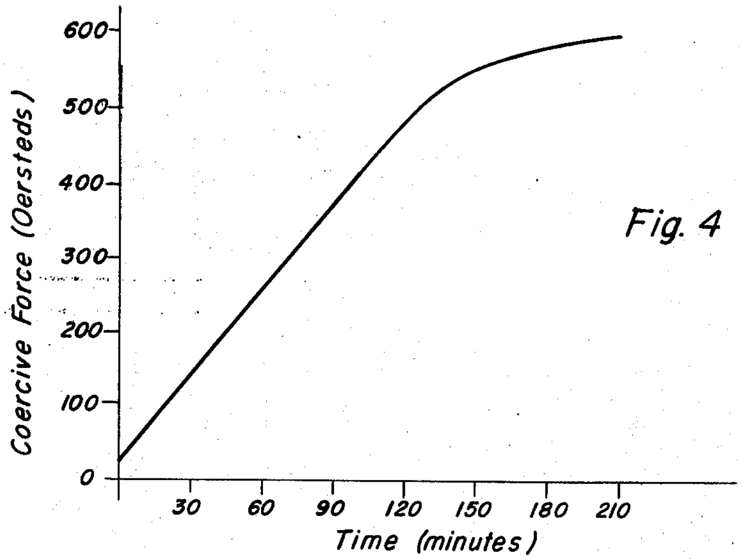
Figure 6:
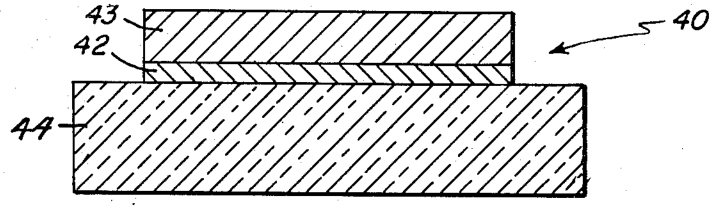
Figure 7:
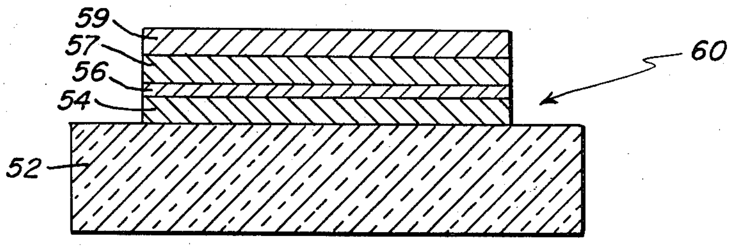

FIG. 4 is a graph depicting variations in coercive force with anneal time for the magnetic medium of FIG. 2, FIG.. 5 is a cross-sectional view of a magnetic medium formed in accordance with this invention wherein the magnetic film is situated intermediate sheaths of nonmagnetic material, FIG. 6 is a cross-sectional view of a magnetic medium formed in accordance with this invention wherein an outer sheath is employed to protect against mechanical injury of the film, and FIG. 7 is a cross-sectional view of a recording medium exhibiting enhanced diffusion of the nonmagnetic sheathing into the magnetic film.

Magnetic films having a coercive force set to a predetermined level within a fixed range preferably are formed, as depicted in FIG. 1, by depositing a magnetic film having a thickness less than 3000 A. upon a substrate (either heated or unheated) and subsequently annealing the magnetic film in a temperature range between 50° C. to 500° C. for a period between 10 to 300 minutes in juxtaposition with a reactive material, e.g. an oxygen bearing atmosphere, to produce the desired coercive force within the film. Thus magnetic recording medium 10 formed by the preferred method of this invention and shown in FIGS. 2 and 3 generally comprises a magnetic film 12 of grain size less than 3000 A. deposited atop a substrate 14 and a material 16 of different magnetic properties, e.g. iron oxide depicted in the enlarged sectional view of FIG. 3, situated along at least a portion of the grain boundaries of the magnetic film to reduce the area of exchange contact between the magnetic film grains. When air is utilized as a convenient supply of reactive gas, the anneal generally must be conducted in an air pressure greater than $10^{-7}$ torr to provide sufficient oxygen to isolate the grain boundaries by oxidation.

The magnetic film 12 depicted in FIGS. 2 and 3 can be conveniently formed by vacuum deposition techniques, such as electron beam evaporation or sputtering, wherein substrate 14 and the source materials employed to form magnetic film 12 are positioned within an enclosed chamber and the magnetic source material is vaporized to be deposited as film 12 upon substrate 14. The deposition preferably is conducted in a vacuum of approximately $10^{-5}$–$10^{-6}$ torr although pressures less than $10^{-6}$ torr may be employed for film depositions, if desired. Similarly poorer vacuums, e.g. to $10^{-3}$ torr, can be utilized in the vacuum deposition provided care is taken to prevent contamination of the magnetic material by the residual gases in the deposition chamber by adjustment of the metal source to substrate distance to a span less than the mean free path of the vaporized metal.

The deposition of the magnetic film upon the substrate preferably is accomplished at a perpendicular attitude relative to the substrate surface for maximum efficiency in deposition. While deposition angles, often approaching the grazing angle, have been known in the prior art to produce high coercive force films, these high coercive force films do not exhibit a radical change in coercive force upon subsequent annealing as do the present perpendicularly deposited films. Thus to produce magnetic films having a readily adjustable coercive force, an angle of incidence greater than 30° (with respect to the plane of the substrate) generally is required during deposition.

Substrate 14 may be any conductive or nonconductive material with glass, copper, aluminum or polyimide films, such as H film sold under the trade name "Kapton" by DuPont, being examples of suitable substrates. The only limitation upon the composition of substrate 14 for use in this invention is that the substrate both must be of a material non-deleterious to the magnetic properties of the adjacent film and must be physically capable of withstanding the annealing temperatures required to raise the coercive force of the film to a desired level. Thus, a material such as Mylar having a softening temperature of approximately 100° C. is not preferred as a substrate material because of the relatively low temperature limitation such material would place upon the subsequent annealing of the film.

Magnetic film 12 is a metal chosen from the group consisting of iron, cobalt, nickel and alloys thereof and the deposition of the film upon the substrate can be effected by any suitable method capable of producing a polycrystalline structure in the deposited film. When known vacuum deposition techniques are utilized to form magnetic film 12, substrate 14 preferably is unheated to produce a magnetic film having a small grain size, e.g. below 500 A. An optimum grain size of approximately 100 A. is desired for magnetic film 12 to provide a plurality of grain boundaries which boundaries may be magnetically isolated by the formation of compounds of different magnetic properties along the grain boundaries during subsequent annealing of magnetic medium 10.

Magnetic film 12 should be less than 3000 A. thick for magnetic medium 10 to exhibit a rise in coercive force upon annealing in accordance with this invention and a magnetic film thickness of 1000 A. or less is preferred in order to produce a maximum increase in coercive force upon annealing of the magnetic medium for an economically feasible period, e.g. 2 hours. For example, an iron magnetic film of 300 A. vacuum deposited on a glass substrate exhibited a rise in coercive force from 38.4 oersteds to 530 oersteds when annealed for 2 hours and 10 minutes at 350° C. in a vacuum of $5\times10^{-5}$ torr while a similarly deposited and annealed 1000 A. iron magnetic film exhibited a limited rise in coercive force from 85 oersteds to 135 oersteds. When a 3000 A. iron magnetic film was annealed under conditions identical to those heretofore described, a decrease in coercive force from 115 oersteds to 77 oersteds was observed. Thus when a magnetic film thickness of over 1000 A. is desired to produce an output signal of more substantial magnitude, the relatively thick magnetic medium preferably is formed by successively depositing and annealing the magnetic film (with or without protective overlayers) in a plurality of thin layers, e.g. a plurality of successive deposited and annealed 500 A. layers of iron, to obtain a laminar structure having a maximum coercive force for the desired film thickness. This method of deposition is to be preferred for the additional reason that faults in one film will not likely occur at the same position in all layers and thus a magnetic defect or dropout will have less chance of occurring in a multiply formed magnetic material of this kind.

Other factors affecting the thicknesses of magnetic film 12 include the adhesion of the film to the substrate and the baking temperature employed during annealing. Thus if magnetic film 12 is deposited to an excessive thickness on substrate 14, during the subsequent annealing internal stresses in the film will tend to peel the film from the surface of the substrate. To alleviate this condition when a relatively thick film is desired, the substrate can be seeded with a suitable material to increase the adhesion of the film to the substrate. The temperature range in which magnetic medium 10 is heated during annealing generally lies between a minimum temperature, e.g. 100° C. for iron and 50° C. for cobalt, below which the oxidation of magnetic film 12 proceeds at such a slow rate as to make annealing at such temperatures economically unfeasible and a maximum temperature at which grain growth occurs in the magnetic film resulting in a lowering of the coercive force of the film. When iron is employed as the magnetic film material, a maximum annealing temperature of approximately 600° C. preferably is utilized. If annealing temperatures above 600° C. are employed, island structures tend to form in the magnetic film thereby adversely affecting the magnetic properties of the film.

The annealing time employed to raise magnetic recording medium 10 to a desired coercive force depends upon the temperature and reactive gas pressure utilized during annealing with periods of 10 minutes to 300 minutes generally being suitable to produce approximately the highest obtainable coercive force for the recording medium. Because the oxidation rate of magnetic film 12 increases with increases in the temperature employed in the annealing, a high anneal temperature generally is preferred. However when the coercive force of the film is to be regulated within very small tolerances, lower annealing temperatures often are more preferentially used. An air pressure greater than $10^{-7}$ torr generally is required in order to supply sufficient oxygen to isolate the magnetic film grain boundaries by oxidation upon annealing.

The rise in coercive force of recording medium 10 during annealing at 350° C. in a vacuum of $5\times10^{-5}$ torr is depicted in FIG. 4 and is monotonically increasing during the initial stages of annealing with a peak permissive value of coercive force being approached asymptotically after approximately 150 minutes. Thus little or no change in coercive force generally is obtained by heating magnetic medium 10 past the 150 minute interval.

Although the annealing of medium 10 preferably is done in a poor vacuum of approximately $5\times10^{-5}$ torr or greater, any suitable conditions or materials which permit a controlled loss of magnetism of the magnetic film grain surface without unduly contaminating the magnetic film beyond the grain boundaries can be employed. Thus in a commercial installation, annealing the magnetic film in a hot silicone oil bath (with or without oxygen bubbling through the silicone oil) may be more suitable than annealing of the magnetic film in the vacuum deposition chamber wherein the films were deposited. Similarly, a material capable of emitting oxygen upon heating may be placed in the deposition chamber to control the oxygen content within the chamber during annealing. Although vacuum deposition is preferred in the formation of the magnetic film 12 because of the precision control of thin film uniformity afforded by such methods, any suitable method for producing films of a similar granular structure can be employed.

In one specific instance of this invention when a 300 A. thick magnetic film 12 was deposited on an unheated glass substrate 14 to form magnetic recording medium 10, a rise in coercivity from 38.4 oersteds to 530 oersteds was effectuated by annealing the magnetic medium for 130 minutes at 350° C. in an enclosed evacuated chamber at a pressure of $5\times10^{-5}$ torr. The variation of coercivity with time during annealing generally proceeded in a fashion similar to the curve of FIG. 4, e.g. an initial rapid monotonic rise in coercive force tapering to a gradual asymptotic approach of the upper coercive force limit of the recording medium. Similarly, in a second embodiment of FIG. 2 wherein the recording medium was formed by the deposition of a 300 A. magnetic iron film upon a copper substrate, annealing of the magnetic medium for 130 minutes at 350° C. in a vacuum of $5\times10^{-5}$ torr produced a rise in coercive force from 96 oersteds to 583 oersteds.

The importance of air pressure during annealing for an increase in coercive force was demonstrated by annealing three identically formed magnetic recording media, e.g. 300 A. iron magnetic films vacuum deposited upon glass substrates at $10^{-6}$ torr, at a plurality of pressures. Samples were first annealed for 70 minutes at 315° C. in $10^{-6}$ torr. The coercive force was measured to be $60\pm2$ oersteds for all of this group and this value corresponds to the coercive force to be expected for a high vacuum anneal. A coercive force increase from 60 oersteds to 175 oersteds was obtained by subsequently heating one of the samples for 2 hours at 350° C. at a pressure of $5\times10^{-5}$. Another of the samples was subsequently heated for 2 hours at 230° C. at one atmosphere and the coercive force was changed from 60 oersteds to 106 oersteds thereby. These results indicate that a controlled oxidation of the grain surfaces (e.g. by control of gas pressure, annealing temperature or annealing time) of the magnetic film is required for an increase in coercive force and oxygen pressures greater than $10^{-7}$ torr generally are required to supply sufficient oxygen to isolate the grain surfaces of the magnetic film. When annealing iron magnetic films in 1 atmosphere air, an annealing temperature below 280° C. generally was required to prevent complete oxidation of the magnetic film grains.

In another embodiment of FIG. 2 wherein the magnetic medium was formed by the vacuum deposition of a 1000 A. cobalt magnetic film atop a glass substrate under conditions identical to those heretofore described for the deposition of iron magnetic film 12, an increase in coercive force from 34.5 to 56.0 oersteds was effectuated by heating the medium for 70 minutes at 350° C. in a vacuum of $5\times10^{-5}$ torr. Similarly, when the magnetic medium of FIG. 2 was formed by the deposition at $10^{-5}$ torr of a 1000 A. thick nickel magnetic film upon an unheated glass substrate, a rise in the coercive force of the magnetic medium from 27 oersteds to 77 oersteds was produced by heating the medium for 130 minutes at 350° C. in a vacuum of $5\times10^{-5}$ torr.

Figure 5:
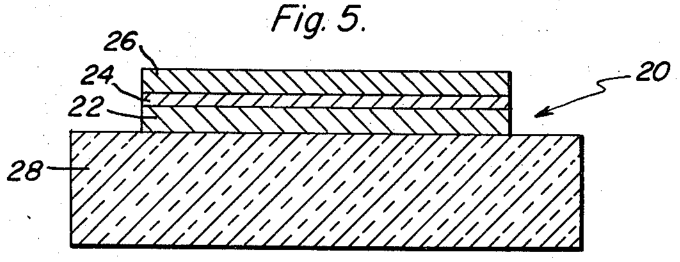

Increases in the coercive force of a magnetic medium by annealing in a reactive gaseous atmosphere also are effective when a protective coating, such as copper or palladium, is deposited atop the magnetic film prior to the annealing to protect the magnetic medium against mechanical injury during subsequent utilization of the medium. One such protected recording medium 20 is shown in FIG. 5 and includes a 500 A. copper layer 22, a 165 A. iron layer 24, and a 500 A. copper layer 26 successively deposited atop a Pyrex substrate 28 utilizing electron beam evaporation techniques. The evaporation chamber was maintained at a pressure of approximately $10^{-6}$ torr during the depositions and the successive layers were deposited at a rate between approximately 3.5 to 4 A. per second. The initial coercive force of the magnetic medium as deposited measured 16.5 oersteds utilizing a hysteresis loop tracer whereupon heating of the magnetic medium was commenced at 300° C. in the relatively poor vacuum of $5\times10^{-5}$ torr in an evacuated chamber. The coercive force of the recording medium was found to rise to 41 oersteds after 30 minutes at 300° C., with continued annealing at 300° C. and $5\times10^{-5}$ torr raising the coercive force of the recording medium to 265 oersteds after a total annealing period of 180 minutes. Subsequent measurement of the magnetic thickness of the magnetic medium 20, e.g. by a measurement of magnetic torque as a function of the known applied field with the field at 45° to the film surface, disclosed that the effective magnetic thickness of the recording medium had decreased from 165 A. to 150 A. Measurement of the magnetization of the film indicated only a 9% decrease in total magnetization as a result of the annealing. Thus an increase in coercive force of over 21 fold was effectuated by annealing the magnetic recording medium of FIG. 5 with only a 9% decrease in the magnetization of the magnetic medium.

A similar increase in coercive force with annealing was demonstrated by the recording medium 40 of FIG. 6 formed by the sequential vacuum deposition of a 300 A. iron magnetic film 42 and a 1000 A. copper film 43 atop a glass substrate 44. The coercive force of magnetic recording medium 40 as deposited measured 46 oersteds. Subsequent to the deposition of the films, the recording medium was annealed for 130 minutes at 350° C. in a vacuum of $5\times10^{-5}$ torr thereby raising the coercive force of the recording medium to 415 oersteds. Similarly, a second recording medium, identical to the recording medium of FIG. 6 except for the utilization of a 300 A. cobalt film as magnetic film 42, exhibited a rise in coercivity from 38.5 oersteds to 52.0 oersteds upon heating for 70 minutes at 350° C. in a vacuum of $5\times10^{-5}$ torr.

It is further possible to control the kinetics and final magnetic properties obtainable by diffusion of other metals into the magnetic film and by variation of the grain size of the magnetic film. As an example, a glass substrate 52 was covered by vacuum deposition with a thin (400 A.) layer of copper 54 on top of which was deposited a 150 A. layer of iron 56 followed by a 400 A. layer of palladium and finally covered with a 400 A. layer of copper 59 to form the recording medium 60 of FIG. 7. A second recording medium identical in all respects to the recording medium of FIG. 7 except for the omission of the palladium layer, e.g. a medium similar to the recording medium depicted in FIG. 5, also was made. When these samples were first examined after formation both mediums had the same 16 oersted coercive force. However after heat treatment for 80 minutes at 350° C. in a pressure of $10^{-4}$ torr, the palladium containing recording medium 60 had developed a coercive force of 380 oersteds while the non-palladium containing recording medium had a coercive force of 265 oersteds. Thus, diffusing or alloying of the constituents during heat treatment can modify the kinetics and final value of the developed coercive force.

Because the rise in coercivity of the magnetic media of this invention with annealing time can easily be determined empirically for the various diverse structures contemplated herein, a specific predetermined coercive force within a permissive range can be obtained by the deposition of a relatively low coercive force magnetic film and the subsequent annealing of the magnetic film, with or without nonmagnetic metallic overlayers, for a time sufficient to produce the desired coercive force in the magnetic medium formed by the annealed film.

While several examples of this invention have been shown and described, it will be apparent to those skilled in the art that many changes may be made without departing from this invention in its broader aspects; and therefore the appended claims are intended to cover all such changes and modifications as fall within the true spirit and scope of this invention.

What we claim as new and desire to secure by Letters Patent of the United States is:

1. A high coercivity magnetic medium comprising:

a substrate, a magnetic film selected from the group consisting of iron, cobalt, nickel and alloys thereof, positioned atop said substrate, said magnetic film having a thickness less than 3000 A., an oxide of said magnetic film situated along at least a portion of the grain boundaries of said magnetic film to reduce the area of exchange contact between said magnetic film grains thereby raising the coercivity of said magnetic films, and a layer of palladium juxtaposed with said magnetic film and a layer of copper overlying said palladium layer.

2. A high coercivity magnetic medium according to claim 1 wherein said magnetic film is iron.

References Cited

UNITED STATES PATENTS

| | | | |
|---|---|---|---|
| 2,900,282 | 8/1959 | Rubens | 117—238 X |
| 3,039,891 | 6/1962 | Mitchell | 117—237 X |
| 3,047,423 | 7/1962 | Eggenberger et al. | 117—239 X |
| 3,102,048 | 8/1963 | Gran et al. | 117—237 X |
| 3,148,079 | 9/1964 | Banks et al. | 117—237 |
| 3,342,632 | 9/1967 | Bate et al. | 117—239 X |
| 3,374,113 | 3/1968 | Chang et al. | 117—237 UX |

OTHER REFERENCES

Whitney, vol. No. 1, June 1964, Protective Coatings for Magnetic Recording Surfaces, IBM.

MURRAY KATZ, Primary Examiner

B. D. PIANALTO, Assistant Examiner

U.S. Cl. X.R.

117—237, 238, 240